(12) United States Patent
Zhang et al.

(10) Patent No.: US 12,531,744 B2
(45) Date of Patent: Jan. 20, 2026

(54) PARTIAL SHA-BASED HASH FUNCTION

(71) Applicant: nChain Licensing AG, Zug (CH)

(72) Inventors: Wei Zhang, London (GB); Steven Patrick Coughlan, London (GB); John Murphy, London (GB); Arthur Gordan, London (GB)

(73) Assignee: nChain Licensing AG, Zug (CH)

( * ) Notice: Subject to any disclaimer, the term of this patent is extended or adjusted under 35 U.S.C. 154(b) by 125 days.

(21) Appl. No.: 18/562,242

(22) PCT Filed: Apr. 25, 2022

(86) PCT No.: PCT/EP2022/060827
§ 371 (c)(1),
(2) Date: Nov. 17, 2023

(87) PCT Pub. No.: WO2022/248130
PCT Pub. Date: Dec. 1, 2022

(65) Prior Publication Data
US 2025/0097045 A1  Mar. 20, 2025

(30) Foreign Application Priority Data
May 24, 2021  (GB) ..................................... 2107350

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
CPC ....... H04L 9/3239; H04L 9/50; H04L 9/3236; H04L 63/123; H04L 9/3247; H04L 2209/56; H04L 9/32
See application file for complete search history.

(56) References Cited

U.S. PATENT DOCUMENTS 9,800,403 B1 * 10/2017 Gomes .................. H04L 9/0643
11,037,118 B2 * 6/2021 Kraemer ................ G06N 5/013
(Continued)

FOREIGN PATENT DOCUMENTS

WO   WO-2019217934 A1 * 11/2019 ............ G06F 11/362

OTHER PUBLICATIONS

Naik,"Optimising the SHA256 Hashing Algorithm for Faster and More Efficient Bitcoin Mining", (Sep. 2, 2013), Retrieved: URL:http://www.nicolascourtois.com/bitcoin/Optimising%20the%20SHA256%20Hashing%20Algorithm%20for%20Faster%20and%20More%20Efficient%20Bitcoin%20Mining_Rahul_Naik.pdf.[retrieved on Dec. 2, 2015].*

(Continued)

*Primary Examiner* — Meng Vang
(74) *Attorney, Agent, or Firm* — Messner Reeves LLP

(57) ABSTRACT

A computer-implemented method of verifying the integrity of part of a pre-image corresponding to a hash digest generated by hashing the preimage with a SHA-based hash function, wherein the pre-image comprises a first message and a second message, and wherein the method comprises: a) receiving an iteration input vector; b) obtaining a second sequence of blocks; c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and d) generating a candidate hash digest based on the final iteration output vector, the candidate hash digest being for comparison with the hash digest.

20 Claims, 3 Drawing Sheets

(56) References Cited

U.S. PATENT DOCUMENTS

| | | | |
|---|---|---|---|
| 11,449,842 B2* | 9/2022 | Baldet | H04L 67/1042 |
| 2018/0227131 A1* | 8/2018 | Ebrahimi | H04L 9/3297 |
| 2023/0114002 A1* | 4/2023 | Flint | G06N 3/0464 |
| | | | 706/25 |

OTHER PUBLICATIONS

Distributed Ledger Technology Distributed Ledger Technology Use Cases: "Technical Report FG DL T D2.1 Distributed ledger technology use cases", ITU-T Draft; Study Period 2017-2020; Study Group 16, International Telecommunication Union, Geneva; CH vol. ties/16 Oct. 4, 2019 (Oc.t 4, 2019), pp. 1-73, XP044276706, Retrieved from the Internet: URL:https://www.itu.int/ifa/t/2017/sg16/docs/191007/td/ties/wp2/T17-SG16-191007-TD-WP2-0213!A2!ZIP-E.zip 2-213-Att.2_report.%20F••DLTd21.pdf [retrieved on Oct. 4, 2019].

GB2107350.7 Combined Search and Examination Report dated Mar. 8, 2022, 11 pages.

Lias Giechaskiel et al: "On Bitcoin Security in the Presence of Broken Crypto Primitives", Iacr, International Association for Cryptologic Research, vol. 20160219:201915, Feb. 19, 2016 (Feb. 19, 2016), pp. 1-17, XP061020463.

PCT/EP2022/060827 International Search Report and Written Opinion dated Aug. 4, 2022, 14 pages.

Quynh H Dang: "Secure Hash Standard NIST FIPS 180-4", NIST, National Institute of Standards and Technology (NIST), Jul. 24, 2015 (Jul. 24, 2015), pp. 1-36, XP061049267, DOI: 10.6028/NIST. FIPS.180-4 Retrieved from the Internet: URL:https://nvlpubs.nist.gov/nistpubs/FIPS/NIST.FIPS.180-4.pdf [retrieved on Jul. 31, 2015].

Rahul P. Naik et al: "Optimising the SHA256 Hashing Algorithm for Faster and More Efficient Bitcoin Mining", Sep. 2, 2013 (Sep. 2, 2013), XP055233141, Retrieved from the Internet: URL:http://www.nicolascourtois.com/bitcoin/Optimising%20the%20SHA256%20Hashing%20Algorithm%20for%20 Faster%20and%20More%20Efficient%20Bitcoin%20Mining_Rahul_Naik.pdf [retrieved on Dec. 2, 2015].

Secure Hash Standard (SHS), Federal Information Processing Standards Publication, Aug. 2015, 36 pages, Department of Commerce United States of America, URL: https://nvlpubs.nist.gov/nistpubs/FIPS/NIST.FIPS.180-4.pdf.

Wikipedia Contributors (Oct. 17, 2023). SHA-2, In Wikipedia, The Free Encyclopedia, URL: https://en.wikipedia.org/w/index.php?title=SHA-2&oldid=1180509463.

Zhang, Wei, Simplified Payment Verification, Medium, Aug. 25, 2020, 7 pages, URL: https://medium.com/nchain/simplified-payment-verification-48ac60f1b26c.

Aitzhan N.Z., et al., "Security and Privacy in Decentralized Energy Trading through Multi-Signatures, Blockchain and Anonymous Messaging Streams," IEEE Transactions on Dependable and Secure, Jan. 1, 2016, XP055409982, 14 pages.

* cited by examiner

|  | $TxID_1$ | | |
|---|---|---|---|
| Version | 1 | Locktime | 0 |
| In-count | 1 | Out-count | 2 |
| Input list | | Output list | |
| Outpoint | Unlocking script | Value | Locking script |
| outpoint 0 | $<Sig>$ $<PK>$ | 0 | OP_FALSE OP_RETURN <Some Data> |
|  |  | $x$ | OP_DUP OP_HASH160 $<H(PK_{Alice})>$ OP_EQUALVERIFY OP_CHECKSIG |

| Version | Input Count | Inputs | Output Count | Output 1 | Output 2 | Locktime |
|---|---|---|---|---|---|---|

PARTIAL SHA-BASED HASH FUNCTION

CROSS REFERENCE TO RELATED APPLICATIONS

This application is the U.S. National Stage of International Application No. PCT/EP2022/060827 filed on Apr. 25, 2022, which claims the benefit of United Kingdom Patent Application No. 2107350.7, filed on May 24, 2021, the contents of which are incorporated herein by reference in their entireties.

TECHNICAL FIELD

The present disclosure relates to a method of proving and verifying the integrity of part of a preimage corresponding to a hash digest generated by hashing the preimage with a SHA-based hash function, i.e. one of the family of SHA hash functions, such as SHA256. For example, the pre-image may comprise part or all of a blockchain transaction.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

The cryptographic hash function SHA256 has been widely adopted in many areas of technology, including blockchain technology. For example, the SHA256 hash function is used for verifying transactions and calculating proof-of-work or proof-of-stake. One property of the SHA256 hash function (and cryptographic hash functions in general) is that, given a hash digest (i.e. the output of a hash function) and a pre-image (e.g. a message), the integrity of the pre-image can be verified by inputting the pre-image to the hash function and verifying that the output hash digest matches exactly with the provided hash digest. This verification is possible because the likelihood of two different pre-images hashing to the same hash digest is vanishingly small when the hash function used is SHA256. The same applies to the other hash functions in the SHA family, e.g. SHA384 or SHA512.

Until now, SHA hash functions, e.g. SHA256, have only been used to prove and verify the integrity of the preimage as a whole. The present disclosure provides a technique for proving and verifying the integrity of part of a preimage, i.e. a partial preimage. That is, a preimage may comprise first and second messages, with embodiments of the present invention enabling the proof and verification that the second message forms part of the preimage. Note that message here is used in a general sense, and does not necessarily mean a communication of any sort, though that is not excluded.

According to one aspect disclosed herein, there is provided a computer-implemented method of verifying the integrity of part of a pre-image corresponding to a hash digest generated by hashing the preimage with a SHA-based hash function. The pre-image comprises a first message and a second message. The method is performed by a verifying party and comprises: a) receiving an iteration input vector, wherein the iteration input vector is generated by partially executing the SHA-based hash function. Partially executing the SHA-based hash function comprises: i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and ii) performing an iteration of a SHA-based hash computation for each of the first sequence of blocks in order of a respective position in the first sequence of blocks, up until a block that comprises one or more bits representing the second message. The method further comprises b) obtaining a second sequence of blocks, wherein the second plurality of blocks is generated by: i) padding a binary representation of the second message to generate a second padded sequence, ii) splitting the second padded sequence into the second sequence of blocks. The method further comprises c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and d) generating a candidate hash digest based on the final iteration output vector, the candidate hash digest being for comparison with the hash digest.

According to another aspect disclosed herein, there is provided a computer-implemented method of proving the integrity of part of a pre-image corresponding to a hash digest generated by hashing the preimage with the SHA-based hash function. The pre-image comprises a first message and a second message. The method is performed by a proving party and comprises: a) generating an iteration input vector, wherein the iteration input vector is generated by partially executing the SHA-based hash function, wherein partially executing the SHA-based hash function comprises: i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and ii) performing an iteration of a SHA-based hash computation for each of the first sequence of blocks in order of a respective position in the first sequence of blocks, up until a block that comprises one or more bits representing the second message. The method further comprises b) making the iteration input vector available to a verifying party.

It has been recognised that the mid-states in the SHA256 algorithm can be utilized to offer an extremely compact integrity proof on the partial preimage of a SHA256 hash value at a computational cost equivalent to computing a hash value using SHA256. The integrity proof can be used for any preimage that can be partitioned into two, where the partial preimage is the latter part. Furthermore, the integrity proof does not reveal the first message, thus enabling the first message to remain secret, if necessary. The same applies to the other hash functions in the SHA family, e.g. SHA384 or SHA512.

In general, the preimage may be any data, and is not limited to the particular examples of preimages described herein. As an illustrative example, the preimage may be part or all of a blockchain transaction. The partial preimage (i.e. second message) may comprise one or more components of the blockchain transaction, e.g. one or more spendable outputs. The described integrity proof allows one to verify that the one or more components (e.g. the one or more spendable outputs) form part of the blockchain transaction, without requiring access to the full transaction. This is particularly advantageous when the blockchain transaction is a large size (i.e. contains a large amount of data), as it allows the spendable outputs (or any other important components of the transaction) to be verified without having to send a large amount of data, thus saving on bandwidth and storage requirements.

As another illustrative example, the preimage may be an identity document, such as a driving license, a passport, a birth certificate, a resident permit, etc. The integrity proof may be used to prove one or more data items that make up an identity document, e.g. (a person's age recorded on their passport), without revealing other sensitive details (e.g. the person's gender). This can be generalised to any document (not just identity documents) where it is beneficial to maintain privacy of at least part of the document. For example, the document may be a contract, where one wishes to verify that a party signed the document (i.e. the partial preimage comprises the signature), without revealing the full terms of the contract.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

1. Example System Overview

Figure 1:
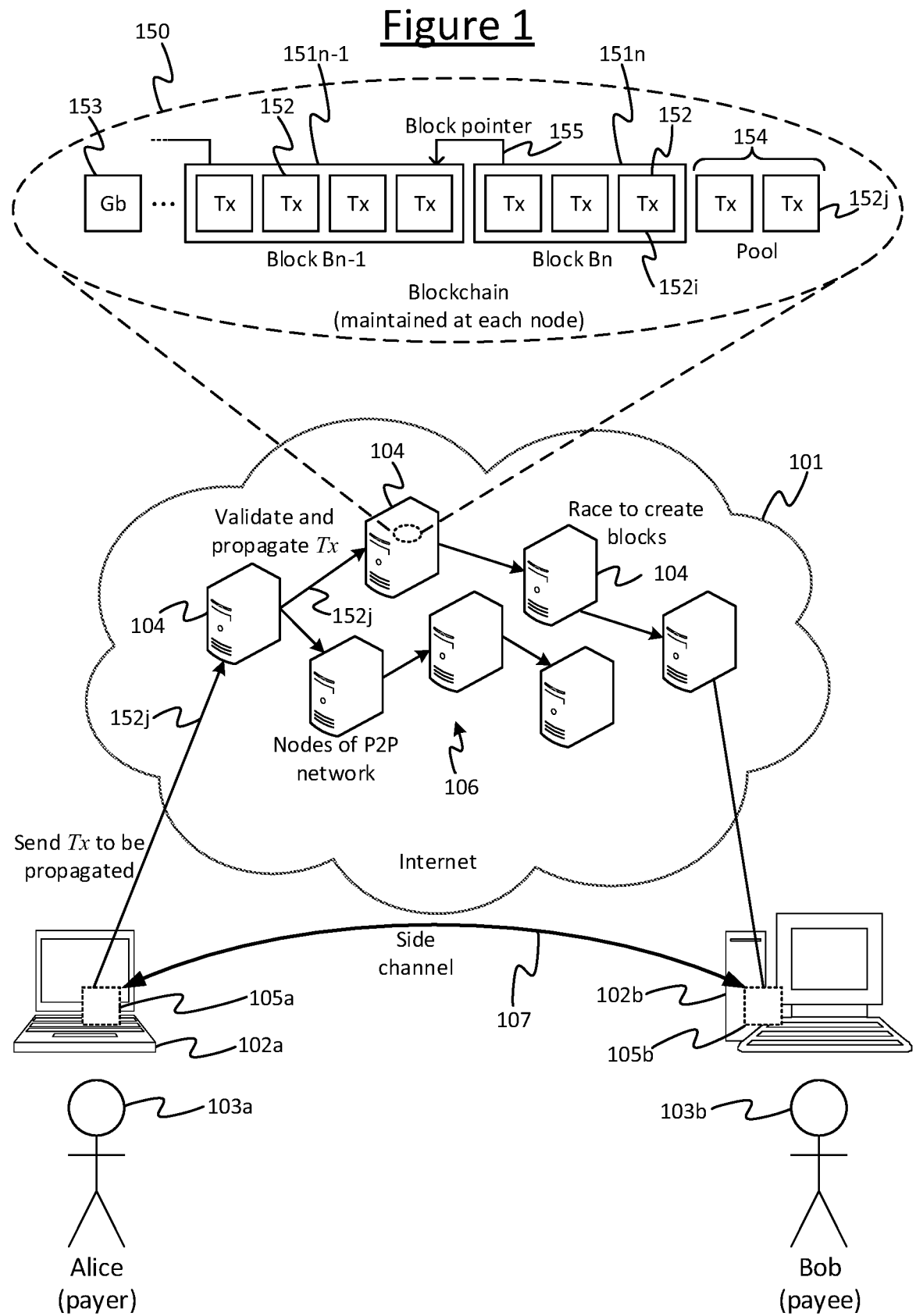
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool".

This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106

(which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152.

Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

2. UTXO-Based Model

Figure 2:
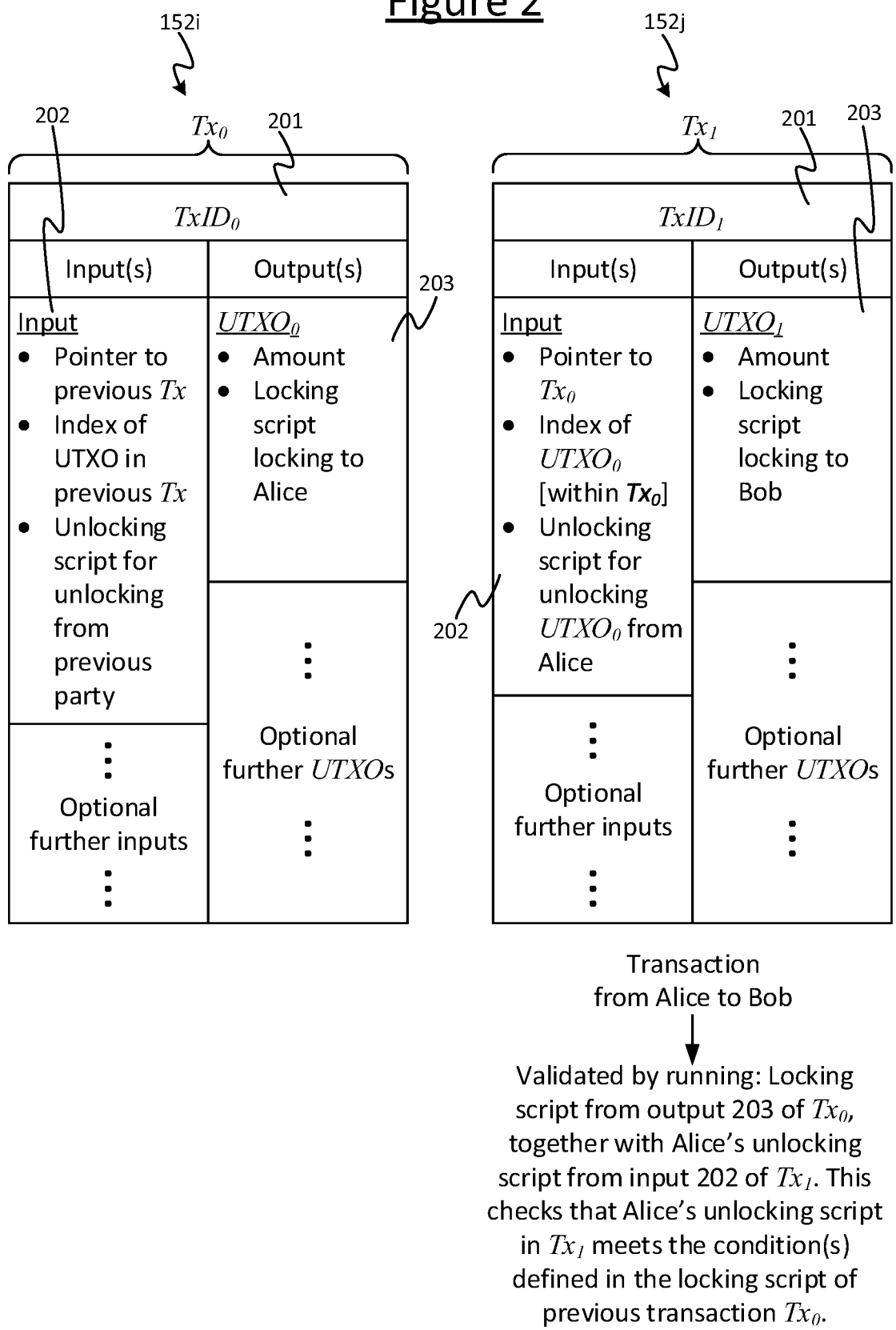
FIG. 2 schematically illustrates some examples of transactions which may be recorded in a blockchain, FIG. 3 schematically illustrates an example system for implementing an integrity proof on a partial preimage, FIG. 4 schematically illustrates an example blockchain transaction.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "|" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

4. Partial SHA256

Embodiments of the present invention enable one to prove that, given a hash digest of a preimage hashed with a SHA hash function (e.g. SHA256, SHA512, etc.), a message (i.e. any piece of data) forms part of the preimage for that hash digest. The part of the preimage to be proved to belong to the preimage is referred to herein as the "partial preimage". It is also referred to as the "second message". In general, the preimage is made up of a first message (i.e. the first part of the preimage) and the second message (i.e. the second part of the message), where the first message precedes the second message. Note that the first and second messages (and the preimage as a whole) is not necessarily a message in the sense of a communication between two or more entities. That is, the term message is used to refer to any type of data. That is, a "message" (whether it be the first message, the second message, or the preimage as a whole) as used in this disclosure does not necessarily mean meaningful content or payload, although that it of course not excluded. For example, a message may comprise user payload and/or content data concatenated with another (non-user-content) element, such as a salt or nonce.

Figures 3, 4, 5:
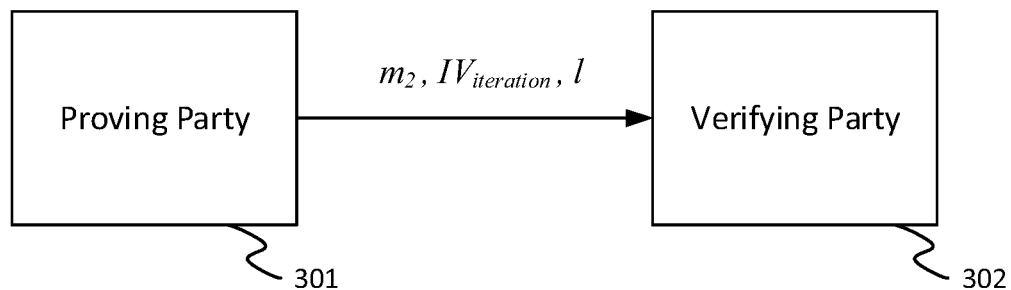
FIG. 5 illustrates an example format of a serialised blockchain transaction.

FIG. 3 illustrates an example system 300 for implementing embodiments of the present invention. The system 300 comprises a proving party 301 and a verifying party 302. The proving party 301 is an entity that wishes to prove to another party (the verifying party 302) that the second message forms part of the preimage corresponding to a hash digest. The verifying party 302 is an entity that wishes to verify that the second message forms part of the preimage corresponding to the hash digest. In general the parties may be any type of entity, e.g. a user such as Alice 103a or Bob 103b, a group of users, an organisation, a machine, a blockchain node 104, etc.

Regardless of the particular type of entity, the proving party 301 and the verifying party 302 operate respective computer equipment comprising respective processing apparatus comprising one or more processors, e.g. one or more CPUs, GPUs, DSP, cryptoprocessor, other accelerator processors, application specific processors, and/or FPGAs. The respective computer equipment of the proving party 301 and the verifying party 302 further comprises memory, i.e. computer-readable storage in the form of a non-transitory computer-readable medium or media. This memory may comprise one or more memory units employing one or more memory media, e.g. a magnetic medium such as hard disk or magnetic tape; an electronic medium such as an SSD, flash memory or EEPROM, ROM, DRAM, SRAM; and/or an optical medium such as an optical disc drive or glass storage. The memory on the respective computer equipment may store software comprising a respective instance of at least one client application arranged to run on the processing apparatus. It will be understood that any action attributed herein to the proving party 301 and the verifying party 302 may be performed using the software run on the processing apparatus of the respective computer equipment of that party. The respective computer equipment comprises at least one user terminal, e.g. a desktop or laptop computer, a tablet, a smartphone, or a wearable device such as a smartwatch. The computer equipment of a given party 301, 302 may also comprise one or more other networked resources, such as cloud computing resources accessed via the user terminal.

Embodiments of the invention will first be described in terms of the SHA-based hash function being the SHA256 hash function. However it will be appreciated that any of the SHA-based hash functions may be used.

Starting from the perspective of the proving party 301 who has access to the whole preimage, i.e. a concatenation of the first and second messages, the proving party 301 partially executes the SHA256 hash function on the preimage. That is, the proving party 301 inputs the preimage to the SHA256 hash function and runs some but not all of the SHA256 hash function (i.e. the algorithm configured to implement the SHA256 hash function). The SHA256 hash function per se is well known, and is described in detail at https://nvlpubs.nist.gov/nistpubs/FIPS/NIST.FIPS.180-4.pdf. See also https://en.wikipedia.org/wiki/SHA-2.

The proving party 301 partially executes the SHA256 hash function to generate an iteration input vector. The iteration input vector is a vector that is output after processing the blocks of bytes that represent the first message. The preimage is represented as a sequence of bytes. The sequence of bytes is padded with one or more bytes to generate a padded sequence. The padding of the sequence of bytes will be familiar to the skilled person as part of the pre-processing phase of the SHA256 hash function. The padded sequence is then split (i.e. parsed) into a sequence of blocks, where each block is sixty four bytes in size. This will be referred to as the first sequence of blocks. Again, the skilled person will be familiar with this splitting. A first plurality of the first sequence of blocks represent the first message, i.e. the first plurality of blocks comprise the bytes representing the first message. The first plurality of blocks may instead by obtained directly from the first message, by splitting the binary representation of the first message into a plurality of sixty four byte blocks. A second plurality of the first sequence of blocks represent the second message, and any padding. That is, the second plurality of blocks comprise the bytes representing the second message and the padding bytes. The SHA256 hash computation is then performed on a first plurality of the blocks, in order. That is, an iteration of the SHA256 hash computation is performed on the first block in the first sequence of blocks, then an iteration of the SHA256 hash computation is performed on the second block in the first sequence of blocks, and so on. The iteration input vector is the output of the iteration of the SHA256 hash function on the final block in the first plurality of blocks. Each iteration of SHA256 hash computation outputs a respective iteration input vector. Therefore for convenience, the iteration input vector output after the final iteration of the SHA256 hash computation on the final block in the first plurality of blocks will be referred to as the target iteration input vector.

Note that any data (e.g. pre-image, first message, second message, padded sequence, blocks, etc.) that is referred to as being represented in bytes may equivalently be represented in bits.

In order to prove that the second message forms part of the preimage, the proving party 301 makes the target iteration input vector available to the verifying party 302. This may involve sending the target iteration input vector to the verifying party 302, e.g. via a secure communication channel. In other examples, the target iteration input vector may be made available at an online resource, e.g. a webpage, which may or may not be publicly accessible (that is, a password or the like may be required to access contents of the webpage).

The verifying party 302 may already have access to the hash digest. If not, the proving party 301 may send the hash digest to the verifying party 302 for use in verifying that the second message is part of the preimage. The proving party 301 may make the hash digest available to the verifying party 302 in other ways, e.g. by publishing the hash digest. It is also not excluded that another party makes the hash digest available to the verifying party 302. In fact, the other party may be the party that generates the hash digest.

Similarly, the proving party 301 may send, or otherwise make available, the second message to the verifying party 302.

As will be discussed below, in some examples the verifying party 302 must know the bit-length or byte length of the preimage. In these examples, the proving party 301 may send, or otherwise make available, the bit-length or byte length of the preimage to the verifying party 302. Additionally or alternatively, the verifying party 302 may obtain the bit-length or byte-length of the first message.

Having obtained the target iteration input vector, e.g. from the proving party 301, the verifying party 302 performs an integrity proof to verify that the second message forms part of the preimage. The verifying party 301 requires access to the second message, represented as a sequence of bytes. The sequence of bytes is padded with one or more bytes to generate a padded sequence. The padded sequence is then split (i.e. parsed) into a sequence of blocks, where each block is sixty four bytes in size. This will be referred to as the second sequence of blocks. The first block in the second sequence comprises the first bytes of the second message. The verifying party 302 may perform said padding, or the verifying party 302 may obtain the padded sequence, e.g. from the proving party 301. The SHA256 hash computation is then performed on the second sequence of blocks, in order. That is, an iteration of the SHA256 hash computation is performed on the first block in the second sequence of blocks, then an iteration of the SHA256 hash computation is performed on the second block in the second sequence of blocks, and so on. As mentioned before, a respective iteration input vector is output at the end of each iteration of the SHA256 hash function. For convenience, the respective iteration input vector output after processing the final block in the second sequence of blocks will be referred to as a final iteration output vector.

To be clear, the iteration input vectors and iteration output vectors take the same format, and are actually one and the same. An "iteration input vector" is merely used to refer to a vector that is to be used as in input to a next iteration of the SHA256 hash computation. An "iteration output vector" is merely used to refer to the output of a previous iteration of the SHA256 hash computation.

The verifying party 302 then generates a candidate hash digest based on the final iteration output vector 302, e.g. by concatenation the elements of the final iteration output vector. If the second message is indeed part of the preimage, then the candidate hash digest should match the hash digest that is claimed to be a hash of the preimage. The verifying part 302 may therefore compare the candidate hash digest and the obtained hash digest, and verify that the two hash digests are equal. As mentioned above, the hash digest may be obtained directly from the proving party 301, or elsewhere, e.g. from the blockchain 150 in the case that the preimage comprises a blockchain transaction.

The following provides further specific examples of the described embodiments.

Suppose we have SHA256 (m)=h, where m=$m_1 \| m_2$ is a message concatenating $m_1$ and $m_2$. If h is known, then one can verify the integrity of m by checking whether SHA256 (m) equals h. It is also possible to verify the integrity of $m_2$ without revealing $m_1$ given the hash value h. This can be done at a computational cost that is equivalent to one computation of SHA256.

4.1 The Inner Working of SHA256

Given an input m, which can be represented by a sequence of bytes, $b_0, b_1, \ldots, b_{n-1}$, the first step is to pad the input. As noted above, the described embodiments can apply to any binary representation of data (e.g. the preimage m), and are not limited to the data being represented in bytes.
1. Append one-byte 0x80 as $b_n$.
2. Append p bytes of 0x00 until when n+1+p=56 mod 64, where p is the smallest positive integer.
3. Represent the bit-length of the input m in 8 bytes in big endian and append it.

The next step is to split the padded input into blocks of 64 bytes. Note that each byte is 8 bits.

$$B_0 = \{b_0, b_1, \ldots, b_{63}\}$$

$$B_1 = \{b_{64}, b_{65}, \ldots, b_{127}\}$$

$$\ldots$$

$$B_k = \{b_{64k}, b_{64k+1}, \ldots, b_{n+p+8}\}$$

The blocks are then processed one by one. We call such process block iterations, or simply iterations. Each block iteration takes two inputs,
1. a vector of 8 elements, each of size 4 bytes, and
2. the block itself, represented by its partition of 16 words, each of size 4 bytes.

For the first block, the input vector is called the initial vector (IV). In the standard implementation of the SHA256 algorithm, IV is set to be the first 32 bits of the fractional parts of the square roots of the first eight prime numbers. For all subsequent blocks, the input vector is the output from the previous block iteration. We call these input vectors iteration input vectors when there is an ambiguity.

Each iteration comprises of a pre-process phase and 64 rounds of shuffling. The pre-process phase generates 64 words, each of size 4 bytes, denoted by $W_0, W_1, \ldots, W_{63}$. The first 16 words are from the block that is processed. All subsequent words are derived from the previous 16 words.

Each round takes two inputs,
1. a vector of 8 elements, each of size 4 bytes, and
2. a word W (consumed in order).

For the first round, the input vector is initialised to the input vector from the block iteration. For all subsequent rounds, the input vector is the output from the previous round. To distinguish them from the iteration input vectors, we call them round input vectors.

At the end of the block iteration, the output from the last round is combined with the iteration input vector to create the output of this block iteration.

4.2 Integrity on Partial Pre-Image Using SHA256

The goal is to prove the integrity of $m_2$ without revealing $m_1$, given h, where SHA256 ($m_1 \| m_2$)=h. The description of the inner working of SHA256 enables us to stop at any point in the computation of a hash value and work out what information is needed to continue the computation. In other words, we can stop when $m_1$ is consumed, identify the required information as mid-state, and continue the computation with $m_2$, where the mid-state does not reveal what $m_1$ is.

We can derive that the required information comprises:
1. the iteration input vector of 8 elements,
2. the round input vector of 8 elements if different from above,
3. the rest of the words to be processed in the current block iteration, and
4. the rest of the blocks to be iterated.

If the byte length of $m_1$ is exactly a multiple of 64, then items 1 and 4 are enough to continue the computation to work out h. Otherwise, we need items 1, 2 and 3 to complete the current block iteration and then move on to the rest of the computation.

Note that item 3 can be replaced by the previous processed 16 words or the first 16 words which represent the block itself, as the rest of the words can be derived from them. Although the security of SHA256 can be inherited by each block iteration to some extent, it is probably not the case for each round in the block iteration. Therefore, if we can assume that by combining item 2 and 3, it is computationally feasible to work out the first 16 words in that block iteration, then we can simplify the list of information to:
1. the iteration input vector of 8 elements denoted by $IV_{iteration}$, and
2. the rest of the blocks to be iterated.

Because of the simplification, we can assume that the length of $m_1$ is exactly a multiple of 64 from now on. We also denote the rest of the computation as partial-SHA256 (pS256). Note that the second part of the message $m_2$ is not equivalent to the rest of the blocks. While the last block contains the length of the input m, the information is not available in $m_2$. Therefore, in the context of verifying the integrity of $m_2$ without revealing $m_1$, we need to know the length of $m_1$ or m in order to construct the padding and the last block.

We can now formally describe the algorithm partial-SHA256. We use $\ell$ for the bit length of m.

pS256 (IV iteration, $m_2$, $\ell$):

Step 1: Append one byte 0x80 to $m_2$, followed by p bytes of 0x00, where p is the smallest positive integer such that $\ell+1+p=56 \mod 64$. Represent $\ell$ in 8 bytes in big endian and append it to the end of the input (i.e. $m_2$ padded).
Output: a list of blocks, each of size 64 bytes.

Step 2: Iterate through the blocks like SHA256 with IV set to $IV_{iteration}$.
Output: a vector of 8 elements, each of size 4 bytes.

Step 3: Concatenate the 8 elements in the output from Step 2.
Output: a hash value of 32 bytes.

Proposition: Suppose a message m has bit length $\ell$, SHA256(m)=h, $m=m_1\|m_2$, where $m_1$ has bit length that is a multiple of 512, and the output for processing m in SHA256 algorithm up to $m_1$ is $IV_{iteration}$. Then for any $m'_2 \neq m_2$, the probability that pS256 ($IV_{iteration}$, $m'_2$, $\ell$)=h is negligible under the assumption that SHA256 is collision resistant.

Proof: Suppose $m'_2 \neq m_2$ such that pS256 ($IV_{iteration}$, $m'_2$, $\ell$)=h. Let $m'=m_1\|m'_2$ and we have SHA256 (m')=h. As $m' \neq m$, we find a collision for SHA256. However, the probability of finding a collision in SHA256 is negligible under the assumption of collision resistance. Therefore, the event pS256 ($IV_{iteration}$, $m'_2$, $\ell$)=h with $m'_2 \neq m_2$ must have negligible probability too.

Now we can prove the integrity of $m_2$ without revealing $m_1$, given the hash value h for m, the mid-state $IV_{iteration}$ for $m_1$, and the bit length $\ell$ of m. This is extremely useful when $m_1$ is either a secret or some data that is too large to be presented, transmitted, or stored.

So far embodiments of the invention have been described in the context of SHA256. However, the described embodiments can be easily adapted to any other SHA function that are covered in the Secure Hash Standard (https://nvlpubs.nist.gov/nistpubs/FIPS/NIST.FIPS.180-4.pdf) [1]. For convenience, the description of partial SHA256 is repeated here.

pS256 (IV iteration, $m_2$, $\ell$):

Step 1: Append one byte 0x01 to $m_2$, followed by p bytes of 0x00, where p is the smallest positive integer such that $\ell+1+p=56 \mod 64$. Represent $\ell$ in 8 bytes in big endian and append it to the end of the input.
Output: a list of blocks, each of size 64 bytes.

Step 2: Iterate through the blocks like SHA256 with IV set to $IV_{iteration}$.
Output: a vector of 8 elements, each of size 4 bytes.

Step 3: Concatenate the 8 elements in the output from Step 2.
Output: a hash value of 32 bytes.

The function can be captured with four components:
1. $IV_{iteration}$,
2. padding,
3. block iteration, and
4. final output.

The technique can be applied to other SHA functions with changes made only to some or all of these components. Starting with SHA-1 and SHA-224 first, the four components are as follows.

|  | SHA-1 | SHA-224 |
|---|---|---|
| $IV_{iteration}$ | A vector of 5 elements, each of size 4 bytes | Same as SHA256 |
| Padding | Same as SHA256 | Same as SHA256 |
| Block iteration | Follow Section 6.1.2 or 6.1.3 in [1] | Same as SHA256 |
| Final output | A vector of 5 elements, each of size 4 bytes | Taking the left most 224 bits from the output in step 3 |

To cover other SHA functions, we start with SHA512.

4.3 The Inner Working of SHA512

Given an input m, which can be represented by a sequence of bytes, $b_0, b_1, \ldots, b_{n-1}$, the first step is to pad the input. As noted above, the described embodiments apply to any binary representation of data (e.g. the preimage m), and are not limited to the data being represented in bytes.

1. Append one-byte 0x80 as $b_n$.
2. Append p bytes of 0x00 until when $n+1+p=112 \mod 128$.
3. Represent the bit-length of the input m in 16 bytes in big endian and append it.

The next step is to split the padded input into blocks of 128 bytes. Note that each byte is 8 bits.

$$B_0 = \{b_0, b_1, \ldots, b_{127}\}$$

$$B_1 = \{b_{128}, b_{129}, \ldots, b_{255}\}$$

$$\ldots$$

$$B_k = \{b_{128k}, b_{128k+1}, \ldots, b_{n+p+16}\}$$

The blocks are then processed one by one. We call such process block iterations, or simply iterations.

Each block iteration takes two inputs,
1. a vector of 8 elements, each of size 8 bytes, and
2. the block itself, represented by its partition of 16 words, each of size 8 bytes.

For the first block, the input vector is called the initial vector (IV). In the standard implementation of the SHA512 algorithm, IV is set to be the first 64 bits of the fractional parts of the square roots of the first eight prime numbers. For all subsequent blocks, the input vector is the output from the previous block iteration. We call these input vectors iteration input vectors when there is an ambiguity.

Each iteration comprises a pre-process phase and 80 rounds of shuffling. The pre-process phase generates 80 words, each of size 8 bytes, denoted by $W_0, W_1, \ldots, W_{79}$. The first 16 words are from the block that is processed. All subsequent words are derived from the previous 16 words.

Each round takes two inputs,
1. a vector of 8 elements, each of size 8 bytes, and
2. a word W (consumed in order).

For the first round, the input vector is initialised to the input vector from the block iteration. For all subsequent rounds, the input vector is the output from the previous round. To distinguish them from the iteration input vectors, we call them round input vectors.

At the end of the block iteration, the output from the last round is combined with the iteration input vector to create the output of this block iteration.

4.4 Integrity on Partial Pre-Image Using SHA512

The goal is to prove the integrity of $m_2$ without revealing $m_1$, given h, where SHA512 $(m_1\|m_2)$=h. The description of the inner working of SHA512 enables us to stop at any point in the computation of a hash value and work out what information is needed to continue the computation. In other words, we can stop when $m_1$ is consumed, identify the required information as mid-state, and continue the computation with $m_2$, where the mid-state does not reveal what $m_1$ is.

We can derive that the required information comprises:
1. the iteration input vector of 8 elements,
2. the round input vector of 8 elements if different from above,
3. the rest of the words to be processed in the current block iteration, and
4. the rest of the blocks to be iterated.

If the byte length of $m_1$ is exactly a multiple of 128, then items 1 and 4 are enough to continue the computation to work out h. Otherwise, we need items 1, 2 and 3 to complete the current block iteration and then move on to the rest of the computation.

Note that item 3 can be replaced by the previous processed 16 words or the first 16 words which represent the block itself, as the rest of the words can be derived from them.

Although the security of SHA512 can be inherited by each block iteration to some extent, it is probably not the case for each round in the block iteration. Therefore, if we can assume that by combining item 2 and 3, it is computationally feasible to work out the first 16 words in that block iteration, then we can simplify the list of information to:
1. the iteration input vector of 8 elements denoted by $IV_{iteration}$, and
2. the rest of the blocks to be iterated.

Because of the simplification, we can assume that the length of $m_1$ is exactly a multiple of 128 from now on. We also denote the rest of the computation as partial-SHA512 (pS512). Note that the second part of the message $m_2$ is not equivalent to the rest of the blocks. While the last block contains the length of the input m, the information is not available in $m_2$. Therefore, in the context of verifying the integrity of $m_2$ without revealing $m_1$, we need to know the length of $m_1$ or m in order to construct the padding and the last block.

We can now formally describe the algorithm partial-SHA512. We use $\ell$ for the bit length of m.

pS512 (IV iteration, $m_2$, $\ell$):
  Step 1: Append one byte 0x80 to $m_2$, followed by p bytes of 0x00, where p is the smallest positive integer such that $\ell+1+p=112 \mod 128$. Represent $\ell$ in 16 bytes in big endian and append it to the end of the input.
    Output: a list of blocks, each of size 128 bytes.
  Step 2: Iterate through the blocks like SHA512 with IV set to $IV_{iteration}$.
    Output: a vector of 8 elements, each of size 8 bytes.
  Step 3: Concatenate the 8 elements in the output from Step 2.
    Output: a hash value of 64 bytes.

Now we can cover SHA384, SHA512-224 and SHA512-256.

| | SHA384 | SHA512-224 | SHA512-256 |
|---|---|---|---|
| $IV_{iteration}$ | Same as SHA512 | Same as SHA512 | Same as SHA512 |
| Padding | Same as SHA512 | Same as SHA512 | Same as SHA512 |
| Block iteration | Same as SHA512 | Same as SHA512 | Same as SHA512 |
| Final output | Taking the leftmost 384 bits from the output in step 3 | Taking the leftmost 224 bits from the output in step 3 | Taking the leftmost 256 bits from the output in step 3 |

4.5 Example Use Case 1—Pre-Image of Large Size

In Bitcoin, a transaction can carry data in an OP_FALSE OP_RETURN output. The size limit on a such output can be configured by Bitcoin nodes and is at 100 KB at the time of writing. It is believed that the limitation would be lifted completely in the future. An interesting part of a transaction is the spendable outputs. To prove the integrity of the spendable outputs, the entire transaction would have to be provided to compute the transaction ID. That is, for example, to prove the integrity of a standard pay-2-public-key-hash output (34 bytes including the output value), the entire transaction, which can be of size over 100 kilobytes at the moment or several gigabytes in the future, would have to be provided. With our solution, most of the transaction data can be redacted to $IV_{iteration}$, which is of a constant size of 32 bytes. An example transaction is shown in FIG. 4.

The transaction ID $TxID_1$ is obtained by hashing the serialised transaction using double SHA256. The serialised transaction is of the format shown in FIG. 5.

We can define $m_1$=version$\|$InputCount$\|$Inputs$\|$OutputCount$\|$Output1, and $m_2$=Output2$\|$Locktime.

To prove the integrity of the second output, one can simply provide $IV_{iteration}$, $\ell_m$, and $m_2$, where $IV_{iteration}$ is of 32 bytes, $\ell_m$ is capped by 8 bytes, and $m_2$ is of 38 bytes including 4 bytes from the locktime. That is, no matter how large the transaction is, the size of the data required to prove the second output is capped by a constant, 78 bytes. The maximum size of data SHA256 can take is capped by the encoding of the length of the data in the padding. The maximum is 2 exabytes, or $2\times10^{18}$ bytes. A 4-bytes $\ell_m$ can cover a transaction of size up to 4 GB.

The idea can be generalised to the last output or the last few outputs. The relevance of their integrity is more apparent when the signature in the spending transaction matters. More precisely, when the public key is linked to an identity or can be interpreted in a specific way, one needs to make sure that the previous locking script indeed required a signature with respect to the given public key. The described integrity proof offers a significant saving in proving the integrity of the previous locking script. The idea can be further generalised to any large data in which the target portion is at the end of the data and is of small size, e.g. the last scene that contains the credits in a large movie. This could be used to prove that an actor has played in a move without sharing the entire movie.

4.6 Example Use Case 2—Pre-Image with Secret

The integrity proof can also be utilised to hide $m_1$ because it is a secret instead of simply being too large. For example, assume that a passport contains information about a person's gender and age, and it is digitally signed by the government. To prove that the person is over 18 without revealing their gender, they can just provide $IV_{iteration}$, their age, and the bit length of the passport document. The verifier can calculate the hash of the document based on the provided information, and hence verify the digital signature from the government.

5. Conclusion

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of verifying the integrity of part of a pre-image corresponding to a hash digest generated by hashing the preimage with a SHA-based hash function, wherein the pre-image comprises a first message and a second message, and wherein the method is performed by a verifying party and comprises:
a) receiving an iteration input vector, wherein the iteration input vector is generated by partially executing the SHA-based hash function, wherein partially executing the SHA-based hash function comprises:
i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and
ii) performing an iteration of a SHA-based hash computation for each of the first sequence of blocks in order of a respective position in the first sequence of blocks, up until a block that comprises one or more bits representing the second message;
b) obtaining a second sequence of blocks, wherein the second plurality of blocks is generated by:
i) padding a binary representation of the second message to generate a second padded sequence,
ii) splitting the second padded sequence into the second sequence of blocks;
c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and
d) generating a candidate hash digest based on the final iteration output vector, the candidate hash digest being for comparison with the hash digest.

A SHA-based hash function is a hash function described in the Secure Hash Standard.

The verifying party may have no knowledge of the preimage nor of the first message.

2. The method of statement 1, comprising:
obtaining the hash digest; and
verifying that the second message is part of the pre-image of the obtained hash digest based on a comparison of the candidate hash digest and the obtained hash digest.

3. The method of statement 1 or statement 2, wherein said receiving of the iteration input vector comprises receiving the iteration input vector from a proving party.

The hash digest and/or the iteration input vector may be obtained from the proving party.

4. The method of any preceding statement, comprising obtaining the second message.

The second message may be sent to the proving party by the proving party.

5. The method of statement 4, wherein said obtaining of the second sequence of blocks comprises generating the second sequence of blocks.

6. The method of statement 4 or statement 5, comprising obtaining the length of the pre-image, and wherein said generating of the second padded sequence is based on the second message and the length of the pre-image.

7. The method of statement 4 or statement 5, comprising obtaining the length of the first message, and wherein said generating of the second padded sequence is based on the second message and the length of the first message 8. The method of any preceding statement, wherein said obtaining of the second sequence of blocks comprises receiving the second sequence of blocks.

9. A computer-implemented method of proving the integrity of part of a pre-image corresponding to a hash digest generated by hashing the preimage with the SHA-based hash function, wherein the pre-image comprises a first message and a second message, and wherein the method is performed by a proving party and comprises:
a) generating an iteration input vector, wherein the iteration input vector is generated by partially executing the SHA-based hash function, wherein partially executing the SHA-based hash function comprises:
   i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and
   ii) performing an iteration of a SHA-based hash computation for each of the first sequence of blocks in order of a respective position in the first sequence of blocks, up until a block that comprises one or more bits representing the second message; and
b) making the iteration input vector available to a verifying party.

10. The method of statement 9, comprising making the hash digest available to the verifying party.

11. The method of statement 9 or statement 10, comprising making the second message available to the verifying party.

12. The method of any of statements 9 to 11, comprising making the bit-length of the pre-image or the first message available to the verifying party.

13. The method of any preceding statement, wherein the first message is not available to the verifying party, such that the integrity of the second message is verified without revealing the first message.

14. The method of any preceding statement, wherein the pre-image comprises at least part of a blockchain transaction.

15. The method of statement 14, wherein the second message comprises one or more outputs of the blockchain transaction.

16. The method of any of statements 1 to 13, wherein the pre-image comprises at least part of an identity document.

17. The method of statement 16, wherein the identity document comprises one of: a driving license, a passport, a birth certificate, and a resident permit.

18. The method of statement 16 or 17, wherein the second message comprises one or more data fields of the identify document.

For instance, the second message may comprise one or more of: a name, an address, an age, a date of birth, a nationality, etc.

19. The method of any preceding statement, wherein the SHA-based hash function is one of: SHA-1, SHA-224, SHA256, SHA384, SHA512-224, SHA512-256, or SHA512-512.

20. The method of statement 19, wherein the SHA-based hash function is one of: SHA1, SHA224 or SHA256, and wherein:
the first padded sequence comprises a multiple of 64 bytes,
the second padded sequence comprises a multiple of 64 bytes, and
each block is 64 bytes in size.

21. The method of statement 19 or statement 20, wherein the SHA-based hash function is SHA224, and wherein the candidate hash digest comprises the leftmost 224 bits of the final iteration output vector.

In embodiments where the SHA-based hash function is one of SHA224 or SHA256, generating the first padded sequence comprises appending one byte representing one to the binary representation of the pre-image. Depending on the length of the pre-image, said generating of the first padded sequence may further comprise appending p bytes representing zero until n+1+p=56 mod 64, where p is the smallest positive integer, and the pre-image is represented with n bytes (i.e. n is the byte-length). Furthermore, said generating may further comprise appending a representation of the bit-length of the pre-image in eight bytes in big endian. The iteration input vector may comprise a vector of eight elements, each element being four bytes in size. Generating the second padded sequence may comprise appending one byte representing one to the binary representation of the second message. Depending on the lengths of the first and second messages, said generating of the second padded sequence may further comprise appending p bytes representing zero until l+1+p=448 mod 512, where p is the smallest positive integer, and l is the bit-length of the pre-image. Equivalently, p bytes representing zero may be appended until n+1+p=56 mod 64, where n is the byte length of the pre-image. Said generating of the second padded sequence may further comprise appending a representation of the bit-length of the pre-image in eight bytes in big endian. The final iteration output vector may comprise a vector of eight elements, each element being four bytes in size.

In embodiments where the SHA-based hash function is SHA1, the initial iteration vector is a vector of five elements, each element being four bytes in size. Similarly, the final iteration output vector comprises five elements, each element being four bytes in size.

22. The method of statement 19, wherein the SHA-based hash function is one of SHA384, SHA512, SHA512-224 or SHA512-256, and wherein:
the first padded sequence comprises a multiple of 128 bytes,
the second padded sequence comprises a multiple of 128 bytes, and
each block is 128 bytes in size.

23. The method of statement 19 or statement 22, wherein:
the SHA-based hash function is SHA384, and wherein the candidate hash digest comprises the leftmost 384 bits of the final iteration output vector; or
the SHA-based hash function is SHA521-224, and wherein the candidate hash digest comprises the leftmost 224 bits of the final iteration output vector; or
the SHA-based hash function is SHA521-256, and wherein the candidate hash digest comprises the leftmost 256 bits of the final iteration output vector.

In embodiments where the SHA-based hash function is one SHA384, SHA512, SHA512-224 or SHA512-256, generating the first padded sequence comprises appending one byte representing one to the binary representation of the pre-image. Depending on the length of the pre-image, said generating of the first padded sequence may further comprise appending p bytes representing zero until n+1+p=112 mod 128, where p is the smallest positive integer, and the preimage is represented with n bytes (i.e. n is the byte-length). Furthermore, said generating may further comprise appending a representation of the bit-length of the pre-image in sixteen bytes in big endian. The iteration input vector may comprise a vector of eight elements, each element being eight bytes in size. Generating the second padded sequence may comprise appending one byte representing one to the binary representation of the second message. Depending on the lengths of the first and second messages, said generating of the second padded sequence may further comprise appending p bytes representing zero until 1+1+p=896 mod 1024, where p is the smallest positive integer, and l is the bit-length of the pre-image. Said generating of the second padded sequence may further comprise appending a representation of the bit-length of the pre-image in sixteen bytes in big endian. The final iteration output vector may comprise a vector of eight elements, each element being eight bytes in size.

24. Computer equipment comprising:
memory comprising one or more memory units; and
processing apparatus comprising one or more processing units, wherein the memory stores code arranged to run on the processing apparatus, the code being configured so as when on the processing apparatus to perform the method of any of statements 1 to 23.

25. A computer program embodied on computer-readable storage and configured so as, when run on one or more processors, to perform the method of any of statements 1 to 23.

According to another aspect disclosed herein, there may be provided a method comprising the actions of the verifying party and the proving party.

According to another aspect disclosed herein, there may be provided a system comprising the computer equipment of the verifying party and the proving party.

The invention claimed is:

1. A computer-implemented method of verifying an integrity of part of a pre-image corresponding to a hash digest generated by hashing the pre-image with a SHA-based hash function, wherein the pre-image comprises a first message and a second message, and wherein the method is performed by a verifying party and comprises:
   a) receiving, from a proving party, an iteration input vector, wherein the iteration input vector is generated by partially executing the SHA-based hash function, wherein partially executing the SHA-based hash function comprises:
      i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and
      ii) performing an iteration of a SHA-based hash computation for each of the first sequence of blocks in order of a respective position in the first sequence of blocks, up until a block that comprises one or more bits representing the second message;
   b) obtaining a second sequence of blocks, wherein the second sequence of blocks is generated by:
      i) padding a binary representation of the second message to generate a second padded sequence,
      ii) splitting the second padded sequence into the second sequence of blocks;
   c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and
   d) generating a candidate hash digest based on the final iteration output vector, the candidate hash digest being for comparison with the hash digest.

2. The method of claim 1, comprising:
obtaining the hash digest; and
verifying that the second message is part of the pre-image of the obtained hash digest based on a comparison of the candidate hash digest and the obtained hash digest.

3. The method of claim 1, wherein said receiving of the iteration input vector comprises receiving the iteration input vector from a proving party.

4. The method of claim 1, comprising obtaining the second message.

5. The method of claim 4, wherein said obtaining of the second sequence of blocks comprises generating the second sequence of blocks.

6. The method of claim 4, comprising obtaining a length of the pre-image, and wherein said generating of the second padded sequence is based on the second message and the length of the pre-image.

7. The method of claim 4, comprising obtaining a length of the first message, and wherein generating of the second padded sequence is based on the second message and the length of the first message.

8. The method of claim 1, wherein said obtaining of the second sequence of blocks comprises receiving the second sequence of blocks.

9. The method of claim 1, wherein the first message is not available to the verifying party, such that the integrity of the second message is verified without revealing the first message.

10. The method of claim 1, wherein the pre-image comprises at least part of a blockchain transaction.

11. The method of claim 10, wherein the second message comprises one or more outputs of the blockchain transaction.

12. The method of claim 1, wherein the pre-image comprises at least part of an identity document.

13. The method of claim 12, wherein the identity document comprises one of: a driving license, a passport, a birth certificate, and a resident permit.

14. The method of claim 12, wherein the second message comprises one or more data fields of the identity document.

15. A computer-implemented method of proving an integrity of part of a pre-image corresponding to a hash digest generated by hashing the pre-image with a SHA-based hash function, wherein the pre-image comprises a first message and a second message, and wherein the method is performed by a proving party and comprises:
   a) generating an iteration input vector, wherein the iteration input vector is generated by partially executing the SHA-based hash function, wherein partially executing the SHA-based hash function comprises:
      i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and ii) performing an iteration of a SHA-based hash computation for each of the first sequence of blocks in order of a respective position in the first sequence of blocks, up until a block that comprises one or more bits representing the second message; and b) making the iteration input vector available to a verifying party.

16. The method of claim 15, comprising making the hash digest available to the verifying party.

17. The method of claim 15, comprising making the second message available to the verifying party.

18. The method of claim 15, comprising making a bit-length of the pre-image or the first message available to the verifying party.

19. Computer equipment comprising:

memory comprising one or more memory units; and processing apparatus comprising one or more processing units, wherein the memory stores code arranged to run on the processing apparatus, the code being configured so as when run on the processing apparatus, the processing apparatus performs a method of verifying an integrity of part of a pre-image corresponding to a hash digest generated by hashing the pre-image with a SHA-based hash function, wherein the pre-image comprises a first message and a second message, and wherein the method is performed by a verifying party and comprises:

a) receiving an iteration input vector, wherein the iteration input vector is generated by partially executing the SHA-based hash function, wherein partially executing the SHA-based hash function comprises:

i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and ii) performing an iteration of a SHA-based hash computation for each of the first sequence of blocks in order of a respective position in the first sequence of blocks, up until a block that comprises one or more bits representing the second message;

b) obtaining a second sequence of blocks, wherein the second sequence of blocks is generated by:

i) padding a binary representation of the second message to generate a second padded sequence, ii) splitting the second padded sequence into the second sequence of blocks;

c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and d) generating a candidate hash digest based on the final iteration output vector, the candidate hash digest being for comparison with the hash digest.

20. A computer program embodied on non-transitory computer-readable storage media and configured so as, when run on one or more processors, the one or more processors perform a method of verifying an integrity of part of a pre-image corresponding to a hash digest generated by hashing the pre-image with a SHA-based hash function, wherein the pre-image comprises a first message and a second message, and wherein the method is performed by a verifying party and comprises:

a) receiving an iteration input vector, wherein the iteration input vector is generated by partially executing the SHA-based hash function, wherein partially executing the SHA-based hash function comprises:

i) obtaining a first sequence of blocks, wherein the first sequence of blocks is obtained by either padding a binary representation of the pre-image to generate a first padded sequence, and splitting the first padded sequence into a first sequence of blocks, or by splitting a binary representation of the first message into the first sequence of blocks, and ii) performing an iteration of a SHA-based hash computation for each of the first sequence of blocks in order of a respective position in the first sequence of blocks, up until a block that comprises one or more bits representing the second message;

b) obtaining a second sequence of blocks, wherein the second sequence of blocks is generated by:

i) padding a binary representation of the second message to generate a second padded sequence, ii) splitting the second padded sequence into the second sequence of blocks;

c) generating a final iteration output vector by performing an iteration of the SHA-based hash computation for each of the second sequence of blocks in order of a respective position in the second sequence of blocks, wherein the iteration of the SHA-based hash computation performed on a first one of the second sequence of blocks is based on the obtained iteration input vector; and d) generating a candidate hash digest based on the final iteration output vector, the candidate hash digest being for comparison with the hash digest.

* * * * *